No. 857,600. PATENTED JUNE 25, 1907.
W. U. COLTHAR.
PAPER HANGER'S TOOL.
APPLICATION FILED AUG. 5, 1905.

WITNESSES:
William F. Bauer.
Irvine Miller.

INVENTOR.
William U. Colthar.
BY
ATTORNEY.

UNITED STATES PATENT OFFICE.

WILLIAM U. COLTHAR, OF SPRINGFIELD, OHIO.

PAPER-HANGER'S TOOL.

No. 857,600.  Specification of Letters Patent.  Patented June 25, 1907.

Application filed August 5, 1905. Serial No. 272,798.

*To all whom it may concern:*

Be it known that I, WILLIAM U. COLTHAR, a citizen of the United States, residing at Springfield, in the county of Clark and State of Ohio, have invented certain new and useful Improvements in Paper-Hangers' Tools, of which the following is a specification, reference being had therein to the accompanying drawings.

This invention relates to paperhangers' tools, and has for its object to provide means whereby wall paper may be applied to a wall in proper relation to its surroundings, with its edges or figure truly positioned relatively to the horizontal and vertical. In the art of paperhanging, the position of the paper is usually determined by the use of a plumb-line, the operation being necessarily a slow one and lacking in accuracy.

It is the object of my invention to provide a simple and efficient means for quickly positioning or determining the position of the paper so as to insure its being truly vertical. As a necessary part of his outfit, the paperhanger employs a straight-edge and trimmer for trimming the edges of the paper, and my invention contemplates the employment of this same straight-edge as a means for determining the position of the paper on the wall, using said straight-edge in conjunction with a spirit-level which may be readily applied thereto and removed therefrom, which may be readily moved longitudinally of the straight-edge to any desired position, and which will remain at any point of the straight-edge to which it may be moved, with the level proper always at a right angle or parallel to the determining edge of the straight-edge, so that by causing the edge or figure of the paper to register with the straight-edge, the position of the paper on the wall may be accurately and quickly determined.

The invention consists in certain novel features which I will now proceed to describe, and will then particularly point out in the claims.

Figure 1:
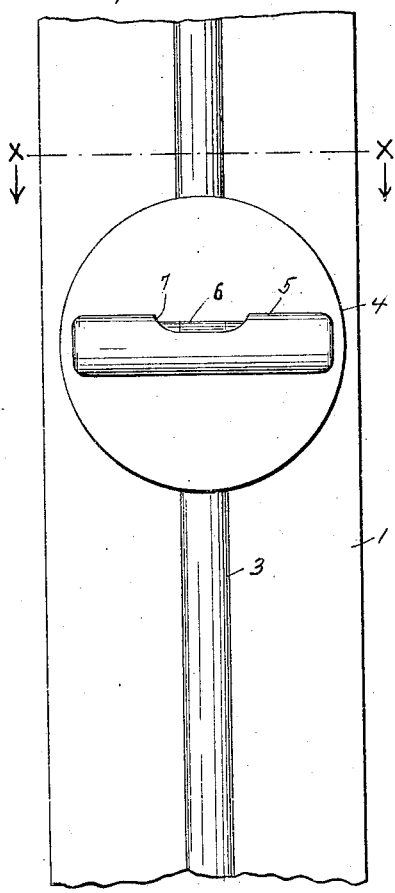
Figure 3:
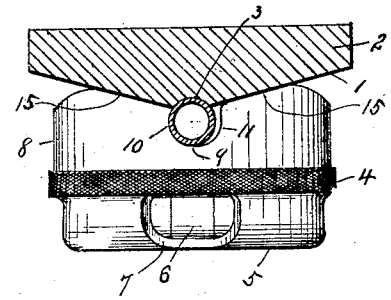
Figure 5:
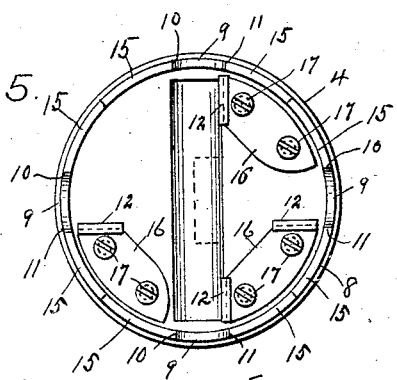
Figure 4:
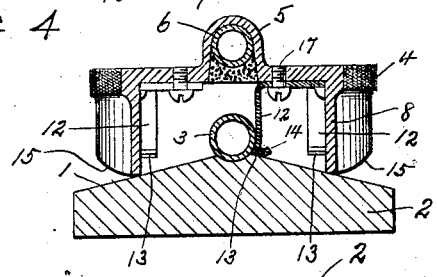
Figure 2:
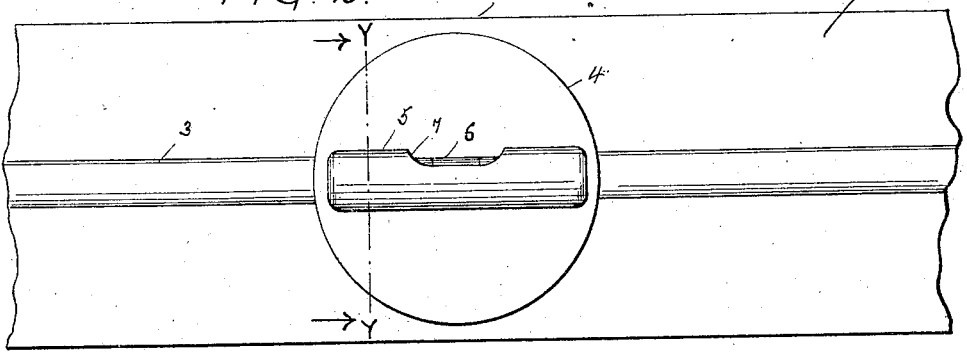

In the accompanying drawings, Figure 1 is an elevation of a structure embodying my invention in one form, showing the device as used for plumbing or vertical determination; Fig. 2 is a view similar to Fig. 1, showing the device as used as a level for horizontal determination; Fig. 3 is a sectional view of the same, taken on the line $x$ $x$ of Fig. 1 and looking in the direction of the arrows; Fig. 4 is a sectional view of the same, taken on the line $y$ $y$ of Fig. 2 and looking in the direction of the arrows; and Fig. 5 is an inverted plan view of the device, detached.

In the said drawings, in which I have shown the preferred embodiment of my invention, 1 indicates a straight-edge such as is used by paperhangers for the purpose of trimming the edge of the paper before it is applied to the wall, said straight-edge having thereon a guide or way along which the trimmer or cutter travels. The particular form of straight-edge shown is one which I have devised, and which is set forth in an application for Letters Patent filed by me August 10, 1904, Ser. No. 220,185. It comprises a wooden body portion 2, and a guide or way 3 mounted thereon and preferably circular in cross section, being so supported above the body that its maximum width is above the surface of the body, its width contracting between said maximum width and the body. Where the guide is circular, as shown, this result is obtained by having less than half of the guide embedded in the wooden body. In connection with this guide I employ an attachment, shown separately in Fig. 5, and applied to the straight-edge in the remaining figures. This attachment comprises a body 4, on the outer face of which is centrally mounted or formed a tubular portion or casing 5, extending diametrically across the body and containing the glass cylinder 6, which, with its inclosed liquid and air bubble, constitutes the spirit-level proper. The tubular casing 5 is cut away, as shown at 7, to form a sight-opening through which the spirit-level may be observed. The body 4 is provided with means whereby it may be readily and directly engaged or coupled with the straight-edge, and preferably with the guide thereof, this engaging or coupling being preferably automatic and of a frictional character, so that the entire detachment may be readily moved longitudinally with respect to the straight-edge. The engaging parts of the body are preferably in two groups or sets, arranged at right angles to each other, the tubular casing being parallel with one group and at right angles to the other group, so that the spirit-level is always either at right angles to the defining edge of the straight-edge or parallel thereto, when applied to the straight-edge. My preferred construction of these engaging parts is that shown, in which the body 4 is provided with a wall 8, preferably continuous and cylindrical in form, in which are formed at opposite points open-mouthed seats, recesses or openings 9, to receive the guide 3. In the preferred form of construction shown, there are four of these seats or openings, arranged in two pairs at right angles to each other, one pair being parallel with the spirit-level, while the other pair is at right angles thereto. Each seat or opening is shaped at one side thereof to conform to the guide, as indicated at 10, thus forming an engaging surface which contacts with the guide on both sides of a central plane passing through the guide parallel with the under or supporting surface of the straight-edge. In this way that portion of said engaging surface which lies nearest the straight-edge when the tool is in position on the guide engages under the reduced or narrow portion of the guide adjacent to the body of the straight-edge. The remainder of the opening 9 is cut away or relieved, as indicated at 11, to admit the guide within the same by a direct application of the device to the face of the straight-edge, thus avoiding the necessity of sliding it along the guide from the end of the straight-edge. Adjacent to each aperture 9 there is located a spring 12, secured to the body 4, within the hollow interior of which it is located, the same being preferably a flat spring, provided with a shoulder 13, which, when the attachment is applied to the straight-edge, engages under the guide on the side thereof opposite to the side engaged by the wall 8 of the corresponding opening 9. The end of said spring is relieved or bent outward, as indicated at 14, to facilitate the admission of the guide into the recess, and the spring yields when the attachment is pressed against the guide, so as to permit the guide to pass into the recess and seat itself therein against the bearing surface 10. This spring presses the wall 8 against the guide with sufficient force to hold the attachment at any point on the guide to which it may be moved, at the same time permitting its ready removal, the spring yielding for that purpose. I prefer to so construct the parts that the body 4 is drawn against the straight-edge by the action of the spring, and I have shown the body as provided with bearing surfaces 15 to rest against the upper side of the straight-edge, which latter being inclined, as shown, the surfaces 15 are correspondingly beveled or inclined.

I have shown the springs 12 as provided with base plates or feet 16, which are attached to the under side of the top of the body 4 by screws 17, and I have also shown two of the springs as having a common base plate or foot. The particular mode of attachment of these parts is immaterial, however.

It will be observed that the paperhanger can use the straight-edge in the ordinary way for trimming the paper, and can subsequently use the same straight-edge to position the paper on the wall either vertically or horizontally. This is done by bringing the straight-edge into proper position relatively to the wall, the attachment being applied to the straight-edge, and the spirit-level indicating when the parts are truly vertical or horizontal. When used for the purpose of plumbing the paper, or getting it truly vertical, the attachment is applied to the straight-edge in the manner shown in Fig. 1, and when used as a level, for the purpose of placing the paper correctly with regard to a true horizontal line, or testing its correctness, the attachment is applied to the straight-edge in the manner shown in Fig. 2. In the former case, the level is at right angles to the defining edge of the straight-edge, while in the latter case it is parallel therewith. In either case, the edge of the paper or the pattern thereof, when this latter is of a character such as to permit its use for this purpose, will, by its registering with the defining edge of the straight-edge, show whether the paper is truly vertical or horizontal, as the case may be. The attachment may be engaged with the straight-edge by a direct movement toward the body of the same by simply pressing it against the guide until the springs catch under the guide, and the attachment will maintain itself in any position on the straight-edge to which it may be moved, so that it may be readily so positioned as to facilitate the observation of the spirit-level, either by sliding it along the guide or by placing it at the desired point. When it is desired to use the straight-edge for trimming again, the attachment may be instantly removed by a slight pull in a direction away from the straight-edge, the springs yielding readily to permit its detachment. The attachment is small and can be readily carried in the pocket, being shown in full size in the drawing.

I do not wish to be understood as limiting myself to the precise details of construction hereinbefore described and shown in the accompanying drawings, as it is obvious that these details may be modified without departing from the principle of my invention.

Having thus fully described my invention, what I claim as new and desire to secure by Letters Patent is:—

1. The combination, with a straight-edge provided with a guide, of an attachment therefor comprising a body, a downwardly extending member supported from the lower side of said body and extending entirely around the same and having guideways formed therein, and means co-acting with the walls of said guideways to engage said guide and retain said attachment in its adjusted position on the straight-edge, substantially as described.

2. The combination, with a straight-edge provided with a guide, of an attachment therefor comprising a body, a downwardly depending flange from near the outer edge of said body and extending entirely around the same and having guideways formed therein, and means co-acting with the walls of said guideways to engage said guide and retain said attachment in its adjusted position on the straight-edge, substantially as described.

3. The combination, with a straight-edge provided with a guide, of an attachment therefor comprising a body, a downwardly extending flange from near the outer edge of said body and extending entirely around the same and having guideways formed therein, and springs adapted to engage said guide and hold the same in frictional engagement with the walls of said guideway, substantially as described.

4. The combination, with a straight-edge provided with a guide, of an attachment therefor comprising a cylindrical body, an annular flange depending therefrom and having recesses therein to form guideways, and springs secured to said body and co-acting with the walls of said guideways to engage said guide and retain said attachment in its adjusted position on said straight-edge, said body having a spirit level diametrically arranged thereon, substantially as described.

5. The combination, with a straight-edge having a guide of diminishing width toward the body of the straight-edge, of an attachment therefor comprising a body provided with a spirit-level and constructed and arranged to engage under the guide, one of the engaging parts being yielding or spring-pressed, to permit direct engagement and to hold the body frictionally in position on the guide, substantially as described.

6. The combination, with a straight-edge having a guide circular in cross section embedded therein for less than half of its diameter, of an attachment therefor comprising a body provided with a spirit-level, said body having seats adapted to fit the guide on one side and relieved or cut away on the other side, and a spring or springs carried by said body and having a shoulder to engage under the side of the guide opposite that against which the body bears, substantially as described.

7. The combination, with a straight-edge having a guide of diminishing width toward the body of the straight-edge, of an attachment therefor comprising a body provided with a spirit-level and constructed and arranged to engage under the guide, said body being provided with bearing surfaces to rest upon the top of the straight-edge, one of the engaging parts being yielding or spring-pressed, to permit direct engagement and to hold the body frictionally against the guide and straight-edge, substantially as described.

8. An attachment for paperhanger's straight-edge comprising a body having a depending flange, two sets of guideways formed in said flange at right angles to each other and adapted to engage the straight-edge, springs carried by said body adapted to co-act with said guideways to hold the body in position on the straight-edge, and a spirit-level mounted on said body parallel with one of said guideways and at right angles to the other, substantially as described.

9. The combination, with a straight-edge having a guide thereon substantially circular in cross section, of a plumbing and leveling attachment therefor comprising a substantially circular body having a spirit-level diametrically mounted thereon, said body having a cylindric wall with opposite recesses arranged in pairs at right angles to each other, each recess having one side adapted to fit the corresponding side of the guide and form an engaging surface, the other side being cut away and provided with a spring adapted to engage under the guide, substantially as described.

In testimony whereof, I affix my signature in presence of two witnesses.

WILLIAM U. COLTHAR.

Witnesses:
 E. O. HAGAN,
 IRVINE MILLER.